United States Patent
Sasaki

(10) Patent No.: US 12,513,409 B2
(45) Date of Patent: Dec. 30, 2025

(54) IMAGE CAPTURING APPARATUS AND CONTROL METHOD THEREFOR

(71) Applicant: CANON KABUSHIKI KAISHA, Tokyo (JP)

(72) Inventor: Takao Sasaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 160 days.

(21) Appl. No.: 18/498,405

(22) Filed: Oct. 31, 2023

(65) Prior Publication Data

US 2024/0155251 A1 May 9, 2024

(30) Foreign Application Priority Data

Nov. 9, 2022 (JP) .................. 2022-179568

(51) Int. Cl.
| | |
|---|---|
| *H04N 23/741* | (2023.01) |
| *H04N 5/265* | (2006.01) |
| *H04N 23/62* | (2023.01) |
| *H04N 23/73* | (2023.01) |
| *H04N 23/743* | (2023.01) |
| *H04N 23/76* | (2023.01) |

(52) U.S. Cl.
CPC ........... *H04N 23/741* (2023.01); *H04N 5/265* (2013.01); *H04N 23/62* (2023.01); *H04N 23/73* (2023.01); *H04N 23/743* (2023.01); *H04N 23/76* (2023.01)

(58) Field of Classification Search
CPC ...... H04N 23/741; H04N 5/265; H04N 23/62; H04N 23/73; H04N 23/743; H04N 23/76
See application file for complete search history.

(56) References Cited

U.S. PATENT DOCUMENTS

| | | | |
|---|---|---|---|
| 2013/0120615 A1* | 5/2013 | Hirooka | H04N 23/743 |
| | | | 348/E5.051 |
| 2020/0322530 A1* | 10/2020 | Choi | G06V 10/10 |

FOREIGN PATENT DOCUMENTS

JP 2021-057626 A 4/2021

* cited by examiner

*Primary Examiner* — Ahmed A Berhan
(74) *Attorney, Agent, or Firm* — Cowan, Liebowitz & Latman, P.C.

(57) ABSTRACT

An image capturing apparatus capable of generating a depth synthetic image with a wide dynamic range efficiently. The image capturing apparatus including a changing unit that changes a focus position, an image capturing unit that obtains images with different exposures by one exposure at each focus position, and a synthesis unit that generates a depth synthetic image having a wider dynamic range and a deeper depth of field than the images obtained by the image capturing unit using the images obtained by the image capturing unit.

14 Claims, 9 Drawing Sheets

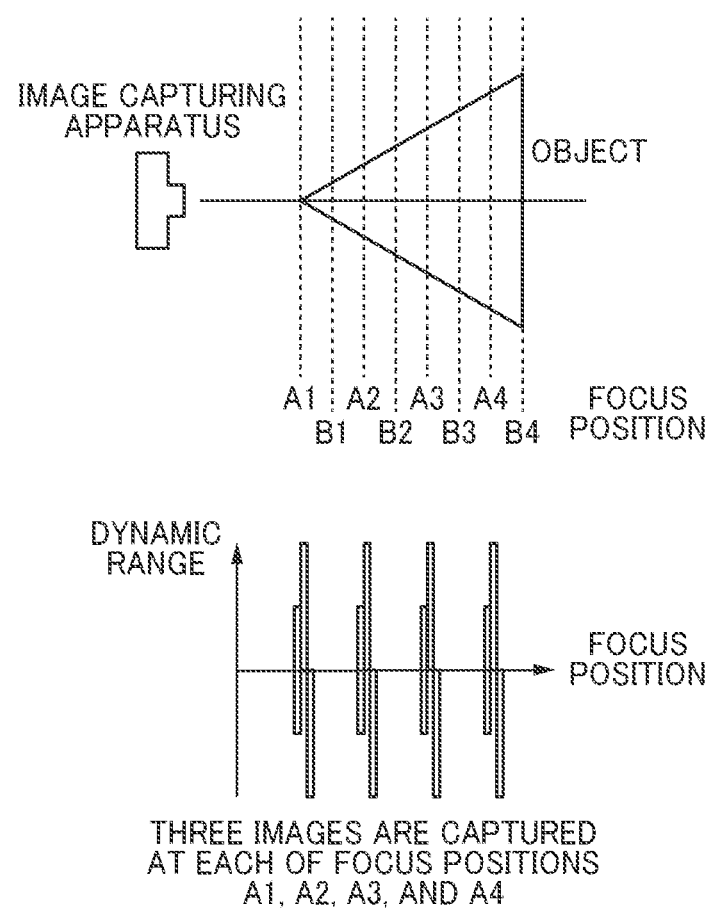

ONE IMAGE IS CAPTURED
AT EACH OF FOCUS POSITIONS
A1, B1, A2, B2, A3, B3, A4, AND B4

FOUR IMAGES ARE CAPTURED
WITH DGO AT EACH OF FOCUS
POSITIONS A1, A2, A3, AND A4

TWO IMAGES ARE CAPTURED WITH DGO
AT EACH OF FOCUS POSITIONS
A1, B1, A2, B2, A3, B3, A4, AND B4

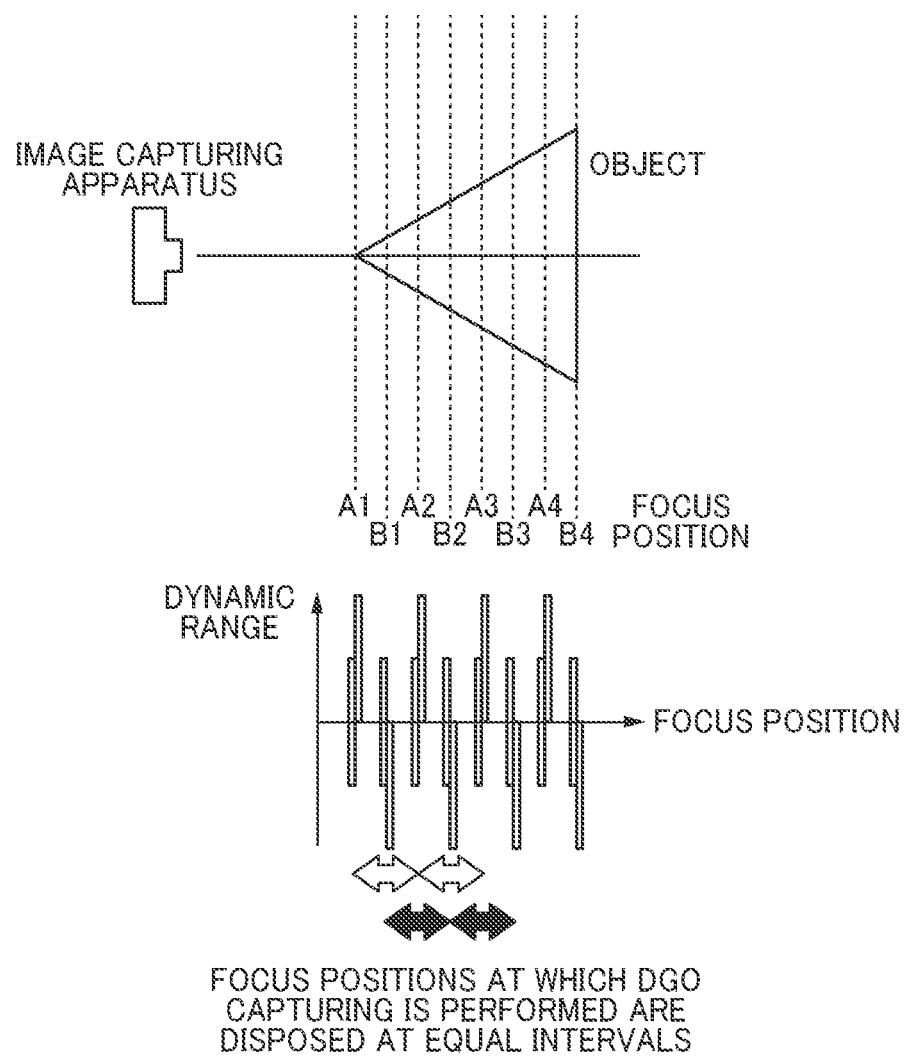

IMAGE CAPTURING APPARATUS AND CONTROL METHOD THEREFOR

BACKGROUND

Field

The present disclosure relates to an image capturing apparatus and a control method therefor.

Description of the Related Art

Conventionally, a method called depth synthesis has been known as a technique for obtaining an image having a deep depth of field. This method generates a pan-focus image having a deep depth of field by cutting focused portions from a plurality of images obtained by repeating capturing while changing a focus position and synthesizing the focused portions. The depth synthesis requires alignment between images because a plurality of images are synthesized. In many cases, change of a focus point in obtaining a plurality of images causes change of an image magnification. Accordingly, a process equivalent to alignment is needed whenever a focus point is changed. In the meantime, there is a case to want to perform the depth synthesis using HDR (High Dynamic Range) images. Japanese Patent Laid-Open Publication (Kokai) No. 2021-57626 (JP 2021-57626A) discloses a technique to generate a depth synthetic image by synthesizing HDR images that are obtained using images captured while changing an exposure.

The technique disclosed in the above-mentioned publication generates a depth synthetic image by synthesizing images captured while changing an exposure. In such a case, two times of development are required for an image of each exposure. The first development is for generating an HDR image and the second development is for alignment. That is, the technique disclosed in the above-mentioned publication needs to develop a RAW image at two times. In addition, since the exposure of the RAW image varies from one image to another, the alignment may not be successful in a scene in which luminance of an object is biased.

SUMMARY

The present disclosure provides an image capturing apparatus and a control method therefor that are capable of generating a depth synthetic image with a wide dynamic range efficiently.

Accordingly, an aspect of the present disclosure provides an image capturing apparatus including a changing unit configured to change a focus position, an image capturing unit configured to obtain images with different exposures by one exposure at each focus position, and a synthesis unit configured to generate a depth synthetic image having a wider dynamic range and a deeper depth of field than the images obtained by the image capturing unit using the images obtained by the image capturing unit.

According to the present disclosure, a depth synthetic image with a wide dynamic range can be generated efficiently.

Further features of the present disclosure will become apparent from the following description of exemplary embodiments with reference to the attached drawings.

BRIEF DESCRIPTION OF THE DRAWINGS

FIG. 2A to FIG. 2D are views schematically showing cases where depth synthetic images having wide dynamic ranges are generated.

FIG. 5A and FIG. 5B are views schematically showing cases where depth synthetic images having wide dynamic ranges are generated.

DESCRIPTION OF THE EMBODIMENTS

Figure 1:
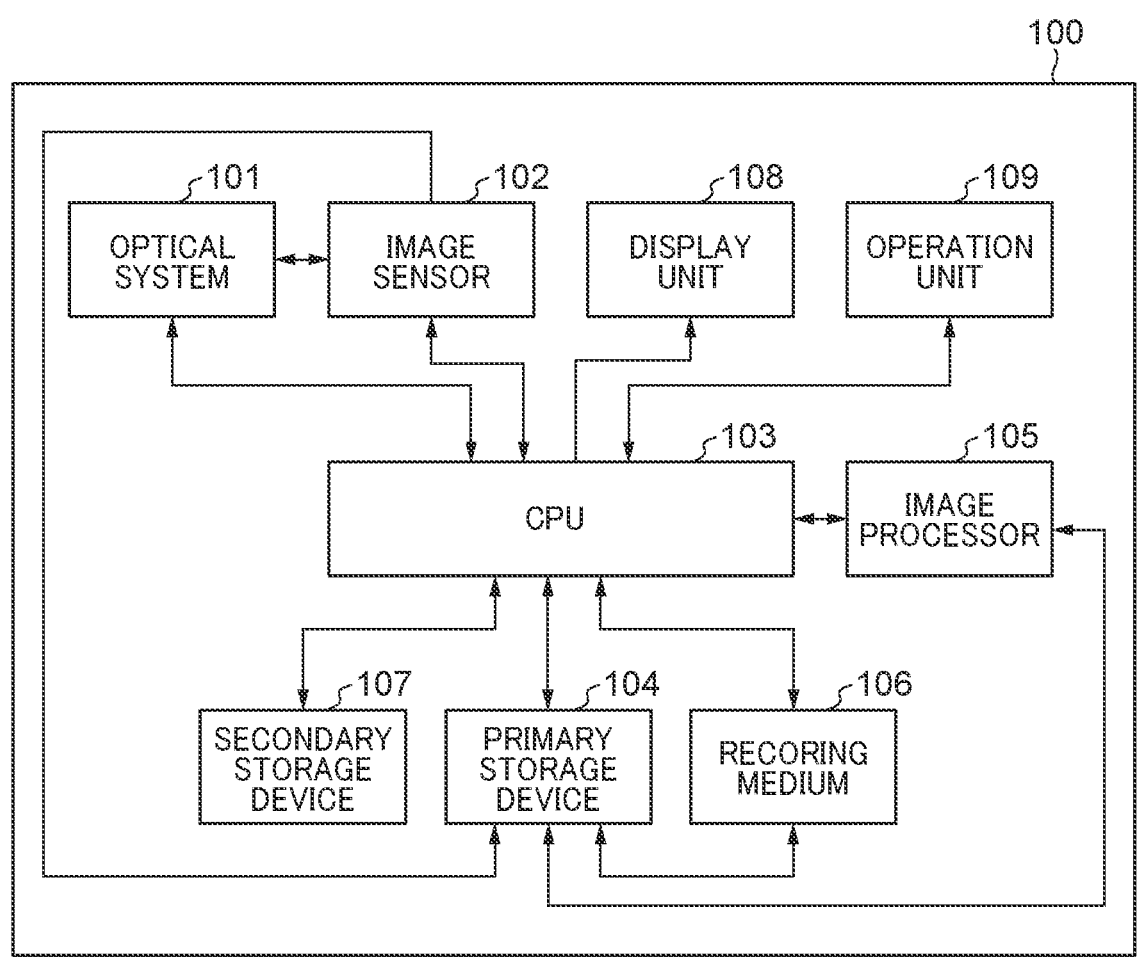
FIG. 1 is a block diagram showing a basic configuration of an image capturing apparatus.

Hereafter, embodiments according to the present disclosure will be described in detail by referring to the drawings. However, configurations described in the following embodiments are merely examples, and the scope of the present disclosure is not limited by the configurations described in the embodiments. For example, each unit constituting the present disclosure can be replaced with any configuration capable of exhibiting the same function. In addition, an arbitrary constituent may be added. Any two or more configurations (features) of the embodiments can be combined.

Hereinafter, a first embodiment will be described with reference to FIG. 1 through FIG. 4. FIG. 1 is a block diagram showing a basic configuration of an image capturing apparatus 100 according to the first embodiment. The image capturing apparatus 100 may be a camera, such as a digital camera or a digital video camera, or an arbitrary electronic apparatus having a camera function, such as a mobile phone having a camera function or a computer having a camera function. The image capturing apparatus 100 includes an optical system 101, an image sensor 102, a CPU 103, a primary storage device 104, an image processor 105, a recording medium 106, a secondary storage device 107, a display unit 108, and an operation unit 109.

The optical system 101 includes lenses, a shutter, and a diaphragm, and forms an image of light from an object on the image sensor 102 under control of the CPU 103. The CPU 103 adjusts so that the light from the object forms an image on the image sensor 102 via the optical system 101. For example, the CPU 103 can adjust focus by moving some lenses of the optical system 101 in an optical axis direction. Alternatively, the CPU 103 may adjust the focus by changing distance between the optical system 101 and the image sensor 102. By such adjustment, the optical system 101 (a changing unit) can change the focus position.

The image sensor 102 is a CCD image sensor, a CMOS image sensor, or the like, and converts light imaged through the optical system 101 into an image signal. The image sensor (an image capturing unit) 102 has two column circuits, which respectively have amplification units with different gains, for an output signal from a unit pixel and can output two images having different gains (Dual Gain Output). Hereinafter, Dual Gain Output is referred to as "DGO". The DGO can output two images having different gains (a high gain image and a low gain image) by one exposure. When synthesis of two images obtained by one capturing operation by the DGO is compared with synthesis of two images obtained by time-division exposure, the DGO has advantages that it does not require an alignment process and is strong against a moving object. Therefore, the DGO is compatible with a means for obtaining an image with an expanded dynamic range.

The CPU 103 achieves functions of the image capturing apparatus 100 by controlling components constituting the image capturing apparatus 100 according to input signals and programs stored in advance. The primary storage device 104 is a volatile device like a RAM and is used as a temporary storage area and a work area of the CPU 103. The information stored in the primary storage device 104 is used by the image processor 105 or is recorded into the recording medium 106. The recording medium 106 records image data obtained by capturing and stored in the primary storage device 104. The recording medium 106 is a semiconductor memory card, for example, that is removable from the image capturing apparatus 100. The data recorded on the recording medium 106 can be read by a personal computer on which the recording medium 106 is mounted. That is, the image capturing apparatus 100 has an attachment/detachment mechanism and a read/write function of the recording medium 106.

The secondary storage device 107 is a nonvolatile storage device like an EEPROM, stores a program (firmware) for controlling the image capturing apparatus 100 and various kinds of setting information, and is used by the CPU 103. The display unit 108 displays a viewfinder image in capturing, a captured image, a GUI image for an interactive operation, and the like. The operation unit 109 is an input device group that receives a user operation and transmits input information to the CPU 103. The operation unit 109 may include a button, a lever, a touch panel, or an input device using sound, a line of sight, etc. The image capturing apparatus 100 has a plurality of patterns of image processes applied to a captured image by the image processor 105. One of the plurality of patterns can be set as a capturing mode by the user using the operation unit 109. The image processor (a synthesis unit) 105 performs an image process called a development process, an image synthesis process using vector calculation, which detects a shift between images, and geometric deformation, color tone adjustment in accordance with the capturing mode, etc. At least a part of the functions of the image processor 105 may be achieved by the CPU 103 in software.

FIG. 2A to FIG. 2D are views schematically showing cases where depth synthetic images having wide dynamic ranges are generated. Hereinafter, four cases will be described with reference to FIG. 2A to FIG. 2D. Each of FIG. 2A to FIG. 2D show that the image capturing apparatus captures images while changing the focus position with respect to an object, performs image magnification correction and alignment with respect to each of the images, and then synthesizes strong contrast portions to generate a depth synthetic image. Details thereof will be described later with reference to FIG. 2A to FIG. 2D. In such a process, a focus position and exposure, and a capturing method are set in every capturing.

Hereinafter, for the sake of convenience, a case where a proper exposure image, an overexposure image, and an underexposure image are obtained as images used to generate a depth synthetic image having a wide dynamic range will be described. However, the exposure, the number of images, and the method are not limited thereto. In FIG. 2A to FIG. 2D, focus positions A1, A2, A3, and A4 and focus positions B1, B2, B3, and B4 that are used in the depth synthesis by the image capturing apparatus are alternately provided. Numbers assigned to the symbols of the focus positions increase by one in the order from the image capturing apparatus to the object. The focus positions A1, A2, A3, and A4 are provided at equal intervals. The focus positions B1, B2, B3, and B4 are also provided at equal intervals. In addition, the focus position B1 is located at a middle of the focus positions A1 and A2, the focus position B2 is located at a middle of the focus positions A2 and A3, and the focus position B3 is located at a middle of the focus positions A3 and A4. Therefore, the focus positions A1, B1, A2, B2, A3, B3, A4, and B4 are provided at equal intervals.

Figure 2B:
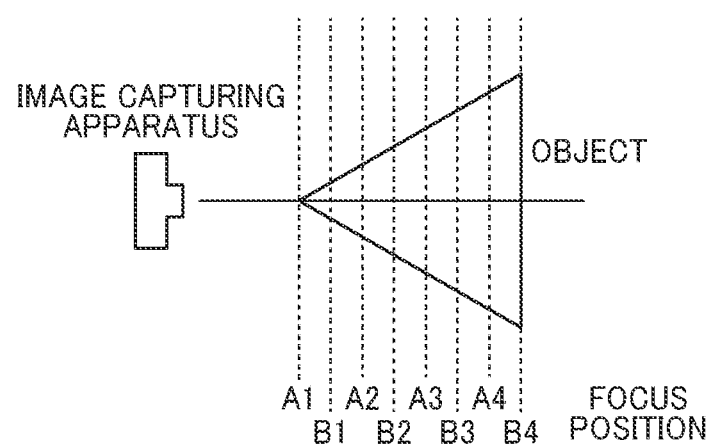
Figure 2B:
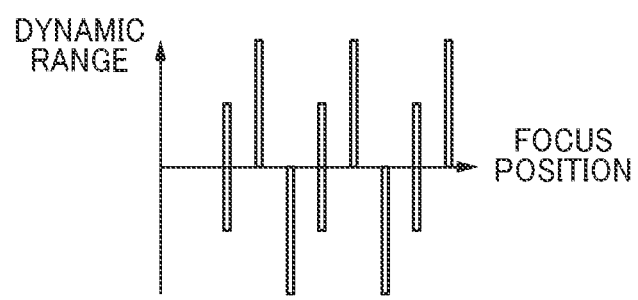

FIG. 2A shows a case where the image capturing apparatus captures three images at each of the focus positions A1, A2, A3, and A4. That is, FIG. 2A shows a case where a proper exposure image, an overexposure image, and an underexposure image are captured at each of the focus positions A1, A2, A3, and A4. In this case, the image capturing apparatus needs to capture three RAW images at each of the focus positions A1, A2, A3, and A4. Since development for equalizing brightness of images is required for the image magnification correction and the alignment in addition to development for synthesizing images by the image capturing apparatus, two or more times of development are required for one RAW image. FIG. 2B shows a case where the image capturing apparatus captures one image at each of the focus positions A1, B1, A2, B2, A3, B3, A4, and B4. In other words, FIG. 2B shows a case where proper exposure images are captured at the focus positions A1, B2, and A4, overexposure images are captured at the focus positions B1, A3, and B4, and underexposure images are captured at the focus positions A2 and B3. Also in this case, one RAW image needs two or more times of development as with the case of FIG. 2A.

Figure 2C:
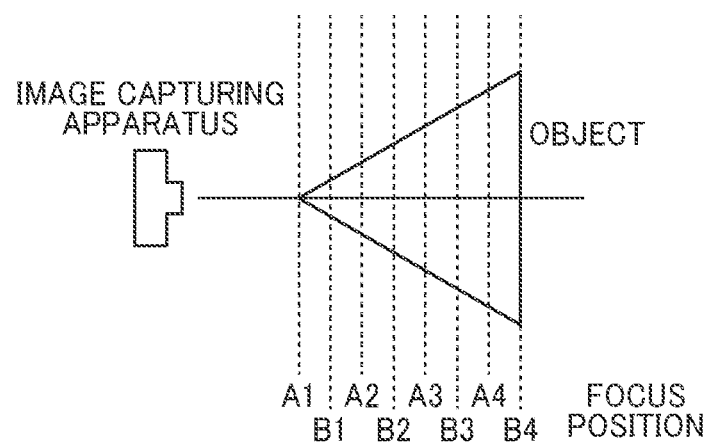
Figure 2C:
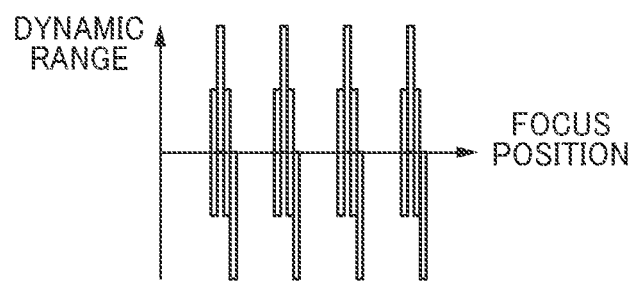

FIG. 2C shows a case where the image capturing apparatus captures four images with the DGO at each of the focus positions A1, A2, A3, and A4. That is, FIG. 2C shows a case where two proper exposure images, an overexposure image, and an underexposure image are captured with the DGO at each of the focus positions A1, A2, A3, and A4. When the image capturing apparatus captures an image with the DGO, two images with different exposures can be obtained by one image capturing operation. One of the two images with different exposures is an overexposure image or an underexposure image for expanding a dynamic range of a depth synthetic image, and the other image is a proper exposure image with the same exposure in the respective image capturing operations. The proper exposure images are also used for the image magnification correction and the alignment, and are captured with the same exposure in the respective capturing operations.

Therefore, in the case of FIG. 2C, development only for the image magnification correction and the alignment is not necessary, and one time of development is needed for each image. That is, each of the images (the proper exposure image, the overexposure image, and the underexposure image) obtained by the capturing is developed only once. This can reduce the number of times of development. In addition, since the DGO that captures two images at the same time is used, the number of capturing times can also be reduced. Further, in the case of FIG. 2C, since the images used for the image magnification correction and the alignment are the proper exposure images, the image magnification correction and the alignment can be performed with high accuracy.

However, when the proper exposure images, the overexposure image, and the underexposure image are captured at each of the focus positions A1, A2, A3, and A4 as shown in FIG. 2C, at least two image capturing operations with the DGO are needed even if two images are simultaneously captured with the DGO. In addition, when the capturing with the DGO is performed twice, four images are captured as a result, and two proper exposure images having the same exposure among the four images are almost the same images. For this reason, the overexposure image, the underexposure image, and one proper exposure image are significant, but a utility value of the remaining proper exposure image is relatively small in many cases.

Figure 2D:
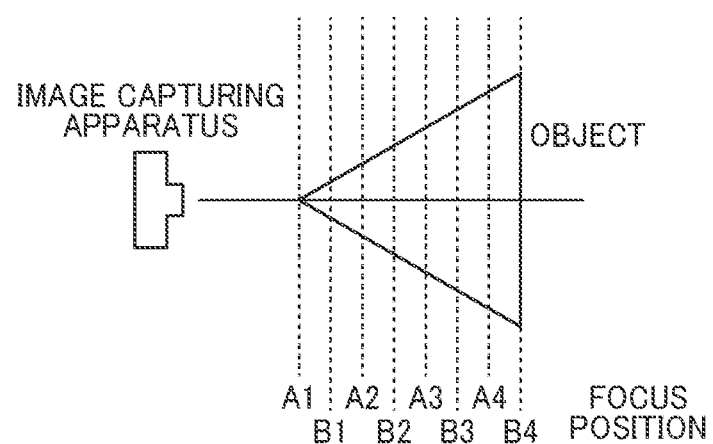
Figure 2D:
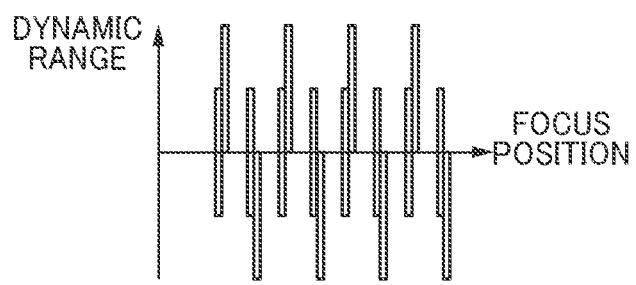

In the first embodiment, in view of the above point, the image capturing apparatus captures two images with the DGO at each of the focus positions A1, B1, A2, B2, A3, B3, A4, and B4 as shown in FIG. 2D. That is, FIG. 2D in the first embodiment shows a case where a proper exposure image and an overexposure image are captured with the DGO at each of the focus positions A1, A2, A3, and A4 and a proper exposure image and an underexposure image are captured with the DGO at each of the focus positions B1, B2, B3, and B4. The proper exposure images are the same exposure images of which the exposures are the same in the respective capturing operations. In addition, contrary to the case of FIG. 2D, the first embodiment includes a case where a proper exposure image and an underexposure image are captured with the DGO at each of the focus positions A1, A2, A3, and A4 and a proper exposure image and an overexposure image are captured with the DGO at each of the focus positions B1, B2, B3, and B4. The case of FIG. 2D in the first embodiment can obtain the same advantages of the case of FIG. 2C. That is, the image magnification correction and the alignment can be performed with high accuracy and the number of times of capturing and the number of times of development can be reduced. Therefore, only one time of development is performed on each image (a proper exposure image, an overexposure image, and an underexposure image) obtained by capturing.

Among four images obtained at adjacent focus positions (e.g., A1 and B1), an overexposure image, an underexposure image, and one proper exposure image are used for the image synthesis, and the remaining one proper exposure image is used only for the image magnification correction and the alignment. In this regard, in the case of FIG. 2C, the proper exposure images used for the image magnification correction and the alignment are obtained at the focus positions A1, A2, A3, and A4. Therefore, in the case of FIG. 2C, for example, the image magnification correction and the alignment are performed by comparing the proper exposure image captured at the focus position A2 with the proper exposure images captured at the focus positions A1 and A3 adjacent to the focus position A2.

In the meantime, in the case of FIG. 2D in the first embodiment, a proper exposure image with the same exposure is obtained every time the focus position is changed. The proper exposure images used only for the image magnification correction and the alignment are obtained at the focus positions B1, B2, B3, and B4 among the focus positions A1, B1, A2, B2, A3, B3, A4, and B4. Therefore, in the case of FIG. 2D in the first embodiment, for example, the image magnification correction and the alignment are performed by comparing the proper exposure image captured at the focus position B1 with the proper exposure images captured at the focus positions A1 and A2 adjacent to the focus position B1. This point is indicated by white arrows in FIG. 3 described later. Further, in the case of FIG. 2D in the first embodiment, since the interval between the focus positions at which the proper exposure images are obtained is half of that in the case of FIG. 2C, it is possible to improve the image magnification correction accuracy and the alignment accuracy.

Figure 3:
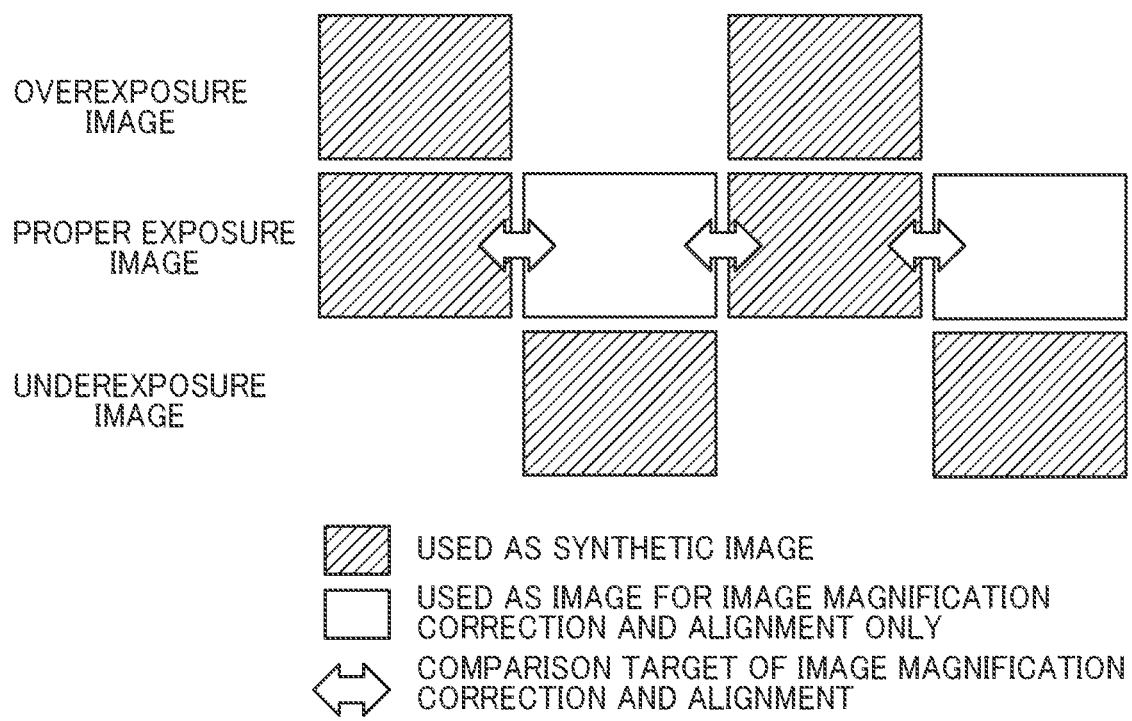
FIG. 3 is a view showing a relationship between an image used for image synthesis and an image used for image magnification correction and alignment in the case of FIG. 2D.

In addition, in the case of FIG. 2D in the first embodiment, as shown in FIG. 3, a step width (a focus position interval) between images having a common exposure (between proper exposure images, between overexposure images, or between underexposure images) among images used as a synthetic image is constant. That is, in the case of FIG. 2D in the first embodiment, the interval between the focus positions at which the proper exposure images and the overexposure images are obtained by the simultaneous capturing with the DGO is equal to the interval between the focus positions at which the proper exposure images and the underexposure images are obtained by the simultaneous capturing with the DGO. Further, both the intervals are equal to the interval between the focus positions at which the proper exposure images used as the synthetic image are obtained by the simultaneous capturing with the DGO. In this way, in the case of FIG. 2D in the first embodiment, the interval between focus positions at which images having the common exposure (proper exposure images, overexposure images, or underexposure images) among images used as a synthetic image are obtained is constant. Therefore, it is possible to obtain a depth synthetic image with a desired step width.

In addition, in the case of FIG. 2D in the first embodiment, an underexposure image and an overexposure image are alternately obtained every time the focus position is changed. Therefore, in the case of FIG. 2D in the first embodiment, underexposure images and overexposure images used for expanding a dynamic range can be obtained by the same number of capturing operations as with the case of FIG. 2C. In the cases of FIG. 2C and FIG. 2D, the two same exposure images obtained by two capturing operations with the DGO are described as proper exposure images. However they are not limited to proper exposure images. There is no problem as long as the exposures of the two images are identical.

Figure 4:
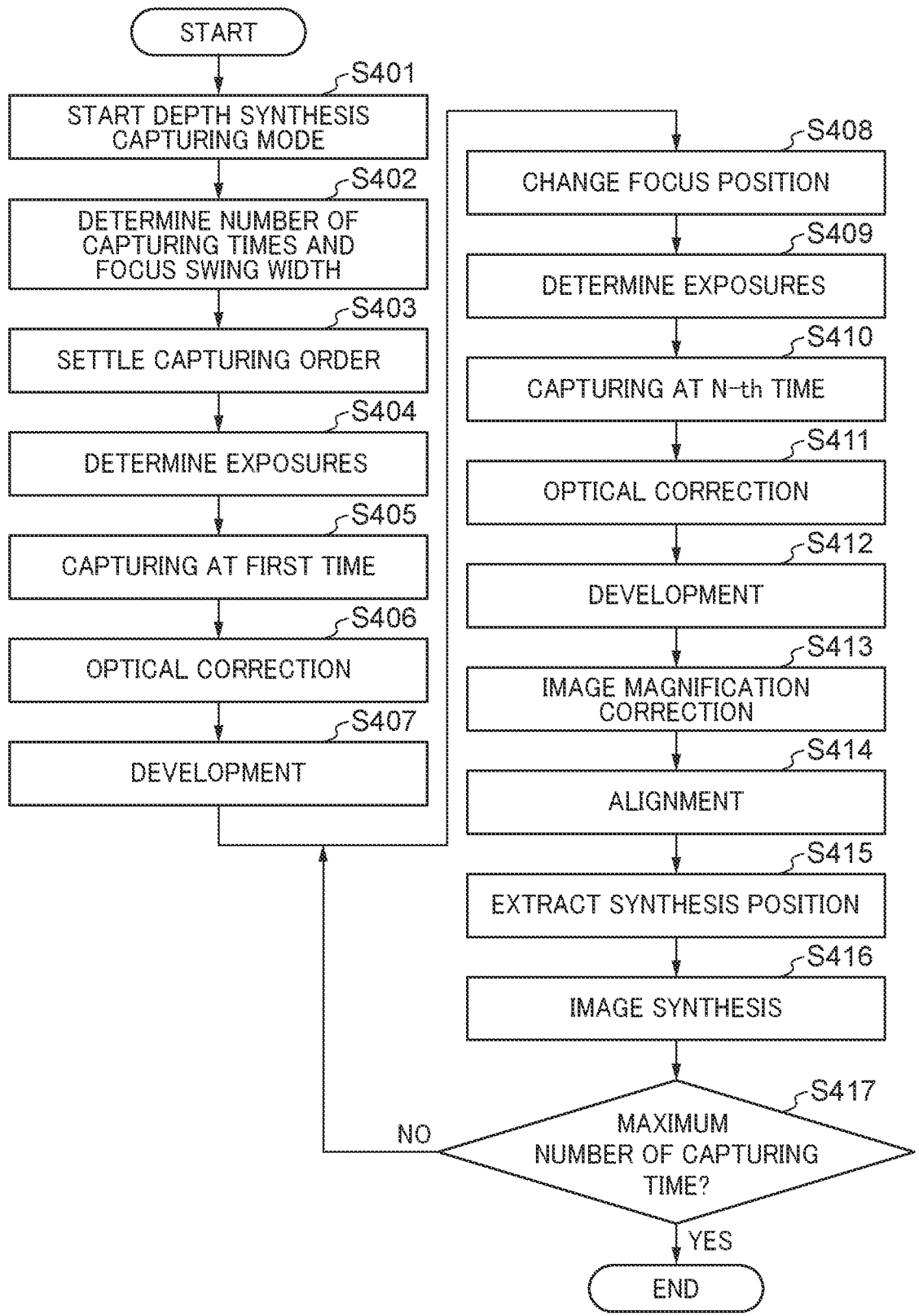
FIG. 4 is a flowchart showing a flow of the depth synthesis.

FIG. 4 is a flowchart showing a flow of the depth synthesis. The process in FIG. 4 (a control method for the image capturing apparatus) is achieved by the CPU 103 (a computer) loading a program stored in the secondary storage device 107 into the primary storage device 104 and executing the program to control components of the image capturing apparatus 100. The flow of the process in FIG. 4 will be described below. In step S401, the CPU 103 starts a depth synthesis capturing mode. This process is performed in response to a user operation on the operation unit 109.

In step S402, the CPU 103 determines the number of capturing times and a step width for the depth synthesis. This process is performed in response to a user operation on the operation unit 109. Although the number of capturing times necessary for the depth synthesis and the step width to a focus position at each capturing time are determined based on a user setting in the following description, they are not limited thereto. In addition, the number of capturing times and the step width determined based on the user setting do not necessarily match the actual number of capturing times and the actual step width. For example, even when the number of capturing times set by the user is "2", if two times of capturing with the DGO are necessary to obtain images with different exposures to generate a depth synthetic image with a wide dynamic range, the actual number of capturing times necessary for the depth synthesis becomes "4".

In step S403, the CPU 103 settles capturing order. As described above, one of two images obtained by the simultaneous capturing with the DGO is assumed to be used for expanding a dynamic range, and the other image is assumed to be captured with a common exposure for use in alignment. In the first embodiment, for the sake of simplicity, as shown in FIG. 2D, although the case where simultaneous capturing of a proper exposure image and an overexposure image and simultaneous capturing of a proper exposure image and an underexposure image are performed will be mainly described for convenience, this configuration is not limiting. In the above described case, the CPU 103 settles which of the simultaneous capturing of the proper exposure image and the overexposure image and the simultaneous capturing of the proper exposure image and the underexposure image is performed first. That is, the CPU 103 settles which of simultaneous capturing of a combination of a proper exposure and an overexposure and simultaneous capturing of a combination of a proper exposure and an underexposure is performed first.

In this regard, the CPU 103 (a settlement unit) measures brightness of an object at an initial focus position and captures images in order in which the brightness of the object can be further expressed. For example, when an object is bright, the CPU 103 uses an image captured with an underexposure rather than an image captured with an overexposure in order to further express the brightness of the object. In addition, the CPU 103 can use a proper exposure image, which is closer to the brightness of the object, in the image synthesis from among the two images simultaneously captured with the combination of the proper exposure and the underexposure. Therefore, the CPU 103 settles the capturing order so that the simultaneous capturing of the proper exposure image and the underexposure image will be performed first.

In contrast, when an object is dark, the CPU 103 uses an image captured with an overexposure rather than an image captured with an underexposure in order to further express the brightness of the object. In addition, the CPU 103 can use a proper exposure image, which is closer to the brightness of the object, in the image synthesis from among the two images simultaneously captured with the combination of the proper exposure and the overexposure. Therefore, the CPU 103 settles the capturing order so that the simultaneous capturing of the proper exposure image and the overexposure image will be performed first. In this way, the CPU 103 can use the proper exposure image closer to the brightness of the object in the image synthesis by settling the capturing order of combinations of images with the different exposures in accordance with the brightness of the object. The user may select the method for settling the capturing order using the operation unit 109 (a selection unit).

In step S404, the CPU 103 (a determination unit) determines different exposures for capturing. This process is performed based on the capturing order settled in the step S403. This means that the exposure of each of the two images simultaneously captured with the DGO is determined because the capturing order is settled in the step S403. In step S405, the CPU 103 performs a first capturing operation of the depth synthesis (an image capturing step). In this process, the CPU 103 controls the optical system 101 and the image sensor 102 to simultaneously capture two images with the DGO at the initial focus position set by the user with the respective exposures determined in the step S404. In step S406, the CPU 103 controls the image processor 105 to perform optical corrections. The optical corrections as used herein refer to corrections that are completed in a single captured image and include a peripheral light amount correction, a chromatic aberration correction, a distortion aberration correction, etc. This also applies to step S411 described later.

In step S407, the CPU 103 controls the image processor 105 to develop the images optically corrected in the step S406. Here, the two images simultaneously captured with the DGO in the step S405 are developed. In step S408, the CPU 103 controls the optical system 101 to change the focus position (a changing step). The change of the focus position is performed based on the step width determined in the step S402. In the step S402, as shown in FIG. 2D, the CPU 103 sets the focus positions A1, A2, A3, and A4 at equal intervals each of which is equal to the step width set by the user and sets the focus positions B1, B2, and B3 at the middles of the focus positions A1, A2, A3, and A4. The focus position B4 is set such that the focus positions B1, B2, B3, and B4 are arranged at equal intervals. As a result, the focus positions at which the proper exposure images and the overexposure images are obtained by the simultaneous capturing with the DGO are set at equal intervals, and the focus positions at which the proper exposure images and the underexposure images are obtained by the simultaneous capturing by the DGO are set at equal intervals. As a result, the focus positions at which the proper exposure images are obtained by the simultaneous capturing with the DGO are also set at equal intervals. In this way, in the first embodiment, as described above, the image magnification correction accuracy and the alignment accuracy are improved as compared with the case of FIG. 2C in which four images are captured at each of the same focus positions.

In step S409, the CPU 103 determines exposures. In this process, the exposure of each of the two images simultaneously captured with the DGO is determined in the same manner as in the step S404. However, since this process is performed based on the capturing order settled in the step S403, the exposures different from the exposures determined in the step S404 are determined. In step S410, the CPU 103 performs the image capturing operation at N-th time for the depth synthesis (an image capturing step). In this process, the CPU 103 controls the image sensor 102 to simultaneously capture two images with the DGO with the respective exposures determined in the step S409. In the step S411, the CPU 103 performs the optical corrections in the same manner as in the step S406. In step S412, the CPU 103 controls the image processor 105 to develop the images optically corrected in the step S411. Here, the two images simultaneously captured with the DGO in the step S410 are developed. In step S413, the CPU 103 controls the image processor 105 to perform the image magnification correction for the depth synthesis (a synthesis step). In step S414, the CPU 103 controls the image processor 105 to perform the alignment for the depth synthesis (the synthesis step). Although the image magnification correction in the step S413 and the alignment in the step S414 are divided into two steps in the flowchart in FIG. 4, they may be performed in one step because both the steps involve geometric deformation.

In step S415, the CPU 103 controls the image processor 105 to extract a synthesis position for the depth synthesis (the synthesis step). Since the depth synthesis generates a depth synthetic image by synthesizing only high contrast portions of the captured images, it is necessary to extract the synthesis position. In step S416, the CPU 103 controls the image processor 105 to perform the image synthesis (the synthesis step). This process is performed based on the synthesis position extracted in the step S415. In step S417, the CPU 103 determines whether the number of capturing times for the depth synthesis has reached the maximum number of capturing times. The maximum number of capturing times is the number of capturing times determined in the step S402. When the CPU 103 determines that the number of capturing times for the depth synthesis has not reached the maximum number of capturing times, the process returns to the step S408. In this way, the depth synthetic image is generated by repeating the steps S408 to S416. In the meantime, when the CPU 103 determines that the number of capturing times for the depth synthesis has reached the maximum number of capturing times, the process of the flowchart in FIG. 4 ends. Thus, the generation of the depth synthetic image is completed.

As described above, the image capturing apparatus 100 according to the first embodiment can efficiently generate a depth synthetic image having a wider dynamic range and a deeper depth of field than images obtained by simultaneous capturing with the DGO by using the images obtained by simultaneous capturing with the DGO. Further, in the first embodiment, every time the focus position is changed, a combination of exposures of two images obtained by simultaneous capturing with the DGO is changed. Further, in the first embodiment, the interval between the focus positions each of which is a position at which two images are obtained by the simultaneous capturing with the DGO is half of that in the case of FIG. 2C. As a result, the image capturing apparatus 100 according to the first embodiment can reduce the number of capturing times and the number of development times as compared with the cases of FIG. 2A and FIG. 2B, and can improve the image magnification correction accuracy and the of the alignment accuracy as compared with the case of FIG. 2C.

A second embodiment will now be described with reference to FIG. 5B. Hereinafter, differences from the first embodiment will be mainly described. In the second embodiment, a case where intervals between focus positions each of which is a position at which two images are obtained by the simultaneous capturing with the DGO are not equal will be described. The present disclosure can be achieved even in such a case.

Figure 5B:
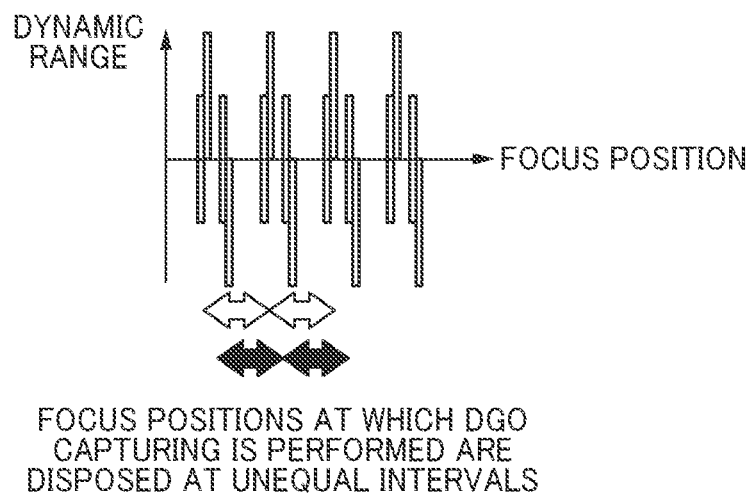

In the above-mentioned first embodiment, the case where the intervals between the focus positions each of which is a position at which two images are obtained by simultaneous capturing with the DGO are equal as shown in FIG. 5A has been described (see FIG. 2D). In FIG. 5A, a white arrow indicates an interval between focus positions at which proper exposure images used for the image synthesis are obtained. The interval is equal to an interval between focus positions at which proper exposure images used only for the image magnification correction and the alignment are obtained. A black arrow indicates an interval between focus positions at which underexposure images used for the image synthesis are obtained. The interval is equal to an interval between focus positions at which overexposure images used for the image synthesis are obtained. It should be noted that these points are the same in FIG. 5B described later.

In the meantime, in the second embodiment, as shown in FIG. 5B, the intervals between the focus positions each of which is a position at which two images are obtained by simultaneous capturing with the DGO are not all equal to each other. Even in this case, as indicated by the white arrows and the black arrows in FIG. 5B, the step widths of images having the common exposure (proper exposure images, overexposure images, or underexposure images) among the images used as the synthetic image are kept constant. That is, the intervals between the focus positions at which images having the common exposure (proper exposure images, overexposure images, or underexposure images) among the images used as the synthetic image are obtained are kept constant. As a result, as described with reference to FIG. 2D, the image magnification correction accuracy and the alignment accuracy are improved as compared with the case of FIG. 2C in which four images are captured at each focus position.

Hereinafter, a third embodiment will be described. Here, differences from the first embodiment will be mainly described. The third embodiment relates to capturing with the DGO at the first focus position and capturing with the DGO at the last focus position. When the depth synthesis is performed, the first capturing with the DGO is performed at the first focus position based on a user's intention. Therefore, since the focus may be slightly deviated from the object at the first focus position depending on the brightness of the object, the user may want to capture both an underexposure image and an overexposure image. Similarly, since the focus may be slightly deviated from the object at the last focus position in a case where the object has a background having a wide dynamic range, the user may want to capture both an underexposure image and tan overexposure image.

In the meantime, in the above-mentioned case of FIG. 2D in the first embodiment, at each of the focus positions A1, B1, A2, B2, A3, B3, A4, and B4, only one of simultaneous imaging of a proper exposure image and an overexposure image with the DGO and simultaneous imaging of a proper exposure image and an underexposure image with the DGO is performed. That is, in the above-mentioned first embodiment, both an underexposure image and an overexposure image cannot be obtained at the first focus position contrary to the user's intention. This point is also applied to the last focus position.

Therefore, the image capturing apparatus 100 according to the third embodiment performs both simultaneous capturing of a proper exposure image and an overexposure image with the DGO and simultaneous capturing of a proper exposure image and an underexposure image with the DGO at the first focus position. Similarly, the image capturing apparatus 100 according to the third embodiment performs both simultaneous capturing of a proper exposure image and an overexposure image with the DGO and simultaneous capturing of a proper exposure image and an underexposure image with the DGO at the last focus position. Accordingly, the image capturing apparatus 100 according to the third embodiment obtains both the underexposure image and the overexposure image at the first focus position as intended by the user. Similarly, the image capturing apparatus 100 according to the third embodiment obtains both the underexposure image and the overexposure image at the last focus position as intended by the user.

That is, the image capturing apparatus 100 according to the third embodiment obtains, at the first focus position, an image with an exposure other than the exposure defined for the first focus position in addition to an image with the exposure defined for the first focus position. In addition, the image capturing apparatus 100 according to the third embodiment obtains, at the last focus position, an image with an exposure other than the exposure defined for the last focus position in addition to an image with the exposure defined for the last focus position. In this way, the image capturing apparatus 100 according to the third embodiment ensures obtainment of an image in which the focus is not deviated from the object at each of the first focus position and the last focus position.

The exposure other than the exposure defined for the first focus position may be automatically set from an exposure defined for a focus position after the first focus position, or may be set by the user using the operation unit 109. Similarly, the exposure other than the exposure defined for the last focus position may be automatically set from an exposure defined for a focus position before the last focus position, or may be set by the user using the operation unit 109.

The function of the image processor 105 may be achieved by a personal computer, a smartphone, a tablet terminal, or the like that is different from the image capturing apparatus 100. In this case, data used by the image processor 105 is transmitted from the image capturing apparatus 100 to the personal computer, the smartphone, the tablet terminal, or the like via wired connection, wireless connection, the recording medium 106, or the like.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-179568, filed Nov. 9, 2022, which is hereby incorporated by reference herein in its entirety.

What is claimed is:

1. An image capturing apparatus comprising:
an optical system configured to change a focus position;
an image capturing unit configured to obtain images with different exposures by one exposure at each focus position;
one or more processors; and
a memory storing instructions which, when executed by the one or more processors, cause the one or more processors to function as:
a synthesis unit configured to generate a depth synthetic image having a wider dynamic range and a deeper depth of field than the images obtained by the image capturing unit using the images obtained by the image capturing unit,
wherein the optical system changes the focus position such that focus positions at which images with a common exposure are obtained among the images obtained by the image capturing unit are provided at equal intervals.

2. The image capturing apparatus according to claim 1, wherein the optical system changes the focus position such that focus positions at which images with all of the different exposures are obtained are provided at equal intervals.

3. The image capturing apparatus according to claim 1, wherein the optical system changes the focus position such that focus positions at which images with one of the different exposures obtained are provided at equal intervals.

4. The image capturing apparatus according to claim 1, wherein the image capturing unit obtains images with a common exposure at respective focus positions changed by the optical system.

5. The image capturing apparatus according to claim 4, wherein the synthesis unit performs alignment using the images with the common exposure.

6. The image capturing apparatus according to claim 5, wherein the images with the common exposure are proper exposure images.

7. The image capturing apparatus according to claim 1, wherein the image capturing unit alternately obtains an underexposure image and an overexposure image each time the focus position is changed.

8. The image capturing apparatus according to claim 1, wherein the image capturing unit obtains, at a first focus position, an image with an exposure other than an exposure defined for the first focus position in addition to an image with the exposure defined for the first focus position.

9. The image capturing apparatus according to claim 1, wherein the image capturing unit obtains, at a last focus position, an image with an exposure other than an exposure defined for the last focus position in addition to an image with the exposure defined for the last focus position.

10. An image capturing apparatus comprising:
an optical system configured to change a focus position;
an image capturing unit configured to obtain images with different exposures by one exposure at each focus position;
one or more processors; and
a memory storing instructions which, when executed by the one or more processors, cause the one or more processors to function as:
a synthesis unit configured to generate a depth synthetic image having a wider dynamic range and a deeper depth of field than the images obtained by the image capturing unit using the images obtained by the image capturing unit;
a settlement unit configured to settle capturing order of combinations of images with different exposures in accordance with brightness of an object; and
a determination unit configured to determine different exposures at each focus position based on the capturing order.

11. An image capturing apparatus comprising:
an optical system configured to change a focus position;
an image capturing unit configured to obtain images with different exposures by one exposure at each focus position;
one or more processors; and
a memory storing instructions which, when executed by the one or more processors, cause the one or more processors to function as:
a synthesis unit configured to generate a depth synthetic image having a wider dynamic range and a deeper depth of field than the images obtained by the image capturing unit using the images obtained by the image capturing unit;
a selection unit configured to allow a user to select capturing order of combinations of images with different exposures; and
a determination unit configured to determine different exposures at each focus position based on the capturing order.

12. A control method for an image capturing apparatus, the control method comprising:
a changing step of changing a focus position;
an image capturing step of obtaining images with different exposures by one exposure at each focus position; and
a synthesis step of generating a depth synthetic image having a wider dynamic range and a deeper depth of field than the images obtained in the image capturing step using the images obtained in the image capturing step,
wherein, in the changing step, the focus position is changed such that focus positions at which images with a common exposure are obtained among the images obtained by the image capturing step are provided at equal intervals.

13. A control method for an image capturing apparatus, the control method comprising:
a changing step of changing a focus position;
an image capturing step of obtaining images with different exposures by one exposure at each focus position;
a synthesis step of generating a depth synthetic image having a wider dynamic range and a deeper depth of field than the images obtained in the image capturing step using the images obtained in the image capturing step;
a settlement step of settling capturing order of combinations of images with different exposures in accordance with brightness of an object; and
a determination step of determining different exposures at each focus position based on the capturing order.

14. A control method for an image capturing apparatus, the control method comprising:
a changing step of changing a focus position;
an image capturing step of obtaining images with different exposures by one exposure at each focus position;
a synthesis step of generating a depth synthetic image having a wider dynamic range and a deeper depth of field than the images obtained in the image capturing step using the images obtained in the image capturing step;
a selection step of allowing a user to select capturing order of combinations of images with different exposures; and
a determination step of determining different exposures at each focus position based on the capturing order.

* * * * *